United States Patent [19]
Williams et al.

[11] 3,973,537
[45] Aug. 10, 1976

[54] FUEL SUPPLY SYSTEMS FOR INTERNAL COMBUSTION ENGINES

[75] Inventors: Malcolm Williams, Solihull; Geoffrey Albert Kenyon Brunt, Glastonbury; Christopher Robin Jones, Alcester; Anthony John Adey, Slough, all of England

[73] Assignee: C.A.V. Limited, Birmingham, England

[22] Filed: Dec. 6, 1974

[21] Appl. No.: 530,409

Related U.S. Application Data
[62] Division of Ser. No. 311,638, Dec. 4, 1972, Pat. No. 3,867,918.

[30] Foreign Application Priority Data
Dec. 3, 1971 United Kingdom............... 56188/71

[52] U.S. Cl..................... 123/139 E; 123/140 MC
[51] Int. Cl.²..................... F02D 1/04; F02M 39/00
[58] Field of Search...................... 123/32 EA, 139 E

[56] References Cited
UNITED STATES PATENTS

| | | |
|---|---|---|
| 3,407,793 | 10/1968 | Lang............................... 123/32 EA |
| 3,546,598 | 12/1970 | McCauley...................... 123/32 EA |
| 3,630,177 | 12/1971 | Engel.............................. 123/32 EA |
| 3,643,635 | 2/1972 | Milam ..................... 123/32 EA |
| 3,665,900 | 5/1972 | Schlimme...................... 123/32 EA |
| 3,693,603 | 9/1972 | Lemanczyk ..................... 123/32 EA |
| 3,699,935 | 10/1972 | Adler et al. ..................... 123/32 EA |
| 3,867,918 | 2/1975 | Williams et al.................. 123/32 EA |

*Primary Examiner*—Charles J. Myhre
*Assistant Examiner*—Ronald B. Cox
*Attorney, Agent, or Firm*—Holman & Stern

[57] ABSTRACT

An electronic governor, particularly for a diesel engine has a summing amplifier receiving signals representing the output of the pumps supplying fuel to the engine, engine speed, and engine demand. The summing amplifier serves to produce an output for operating the pump in accordance with predetermined engine current characteristics. A second summing amplifier may be used to override the first summing amplifier to limit maximum fuel. Alternatively, the first summing amplifier may compare demanded fuel supply with actual fuel supply, in which case the second amplifier sets the maximum speed.

45 Claims, 15 Drawing Figures

FUEL SUPPLY SYSTEMS FOR INTERNAL COMBUSTION ENGINES

This application is a divisional application from our application Ser. No. 311,638 filed Dec. 4, 1972, now U.S. Pat. No. 3,867,918.

The invention relates to fuel supply systems for engines more particularly but not exclusively to fuel injection systems for compression ignition engines.

In one aspect, the invention resides in a fuel supply system for an engine, comprising in combination a pump for supplying fuel to the engine, pump control means for determining the output of the pump, means for producing a first electrical signal representing the pump output, means for producing a second electrical signal representing engine speed, means for producing a demand signal representing the required engine speed, and a summing amplifier to which the three signals are applied, the summing amplifier comparting the three signals and controlling the pump control means.

In another aspect, the invention resides in a fuel supply system for an engine, comprising in combination a pump for supplying fuel to the engine, pump control means for determining the output of the pump, a first summing amplifier to which are fed electrical signals representing the demanded and actual values of a parameter of the system, the first summing amplifier comparing the signals and producing an output for controlling the pump control means, a second summing amplifier to which are fed electrical signals representing a further system parameter and a reference, and a discriminator coupling the first and second summing amplifiers to the pump control means, the output from the discriminator at any given instant being the output from the summing amplifier which demands the least fuel, so that the second summing amplifier limits the maximum value of said further system parameter.

In another aspect, the invention resides in a fuel supply system for an engine, comprising in combination a pump supplying fuel to the engine, an actuator for controlling the output of the pump, a first transducer for measuring engine speed, a second transducer for measuring demand, a third transducer for measuring the output of the pump, a control circuit operable in accordance with the outputs from the transducers for controlling the actuator, said control circuit restricting the output of the pump to a predetermined maximum value, and a control network which receives an input from the first transducers and provides an input to the control circuit for a range of engine speeds so that the maximum pump output is modified for said range of speeds.

In another aspect, the invention resides in a fuel supply system for an engine, comprising in combination a pump for supplying fuel to the engine, an actuator for controlling the output of the pump, a control circuit for comparing at least two engine parameters and providing an output for controlling the actuator and so regulating the output of the pump, said control circuit incorporating means for restricting the maximum pump out output, and the system including circuit means having a first state and a second state, said circuit means when in its second state increasing the maximum pump output, said circuit means being driven to its second state when the engine speed is below cranking speed and being driven to its first state when the engine speed is above a datum speed, the datum speed being in excess of the cranking speed.

In another aspect, the invention resides in a fuel supply system for an engine, comprising in combination first, second and third transducers producing output voltages representing respectively rate of supply of fuel to the engine, engine speed and demand, the outputs from the transducers being fed to the inverting terminals of one or more summing amplifiers which form part of a control circuit for determining the rate of supply of fuel to the engine in accordance with the required characteristics of the system, the system further including one or more current sources operable under selected system conditions to modify a characteristic of the system by altering the current flowing to an inverting terminal of one of the summing amplifiers.

In the accompanying drawings.

All the examples described relate to a fuel injection system for a diesel engine driving a road vehicle, so that demand is set by an accelerator pedal. However, the arrangements shown can be used with other engines, and the engine employed need not drive a road vehicle, in which case the demand is of course set in some other way.

Figure 1:
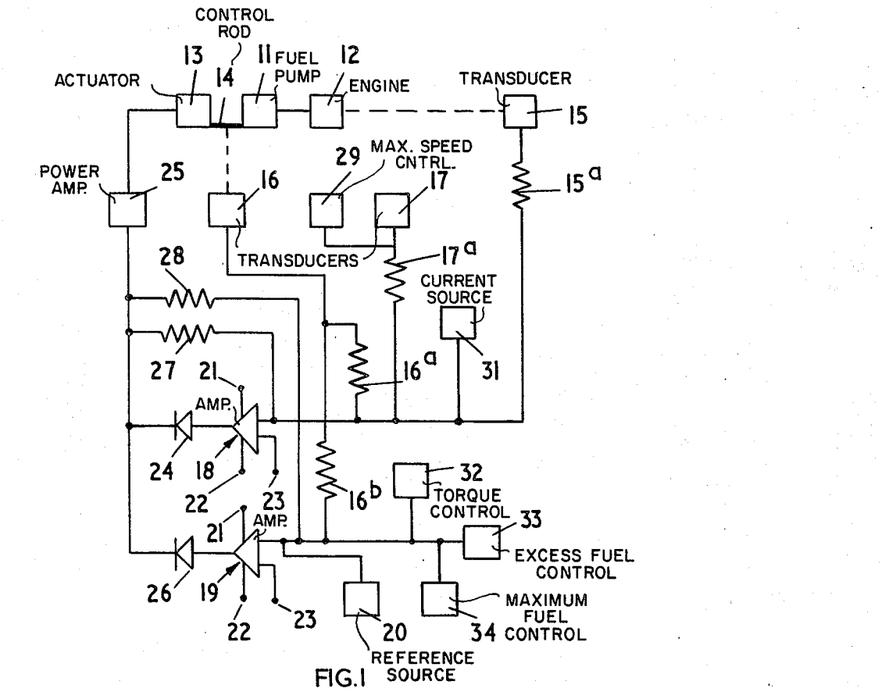
FIG. 1 is a circuit diagram, partly in block form, illustrating one example of the invention.

Referring first to FIG. 1, a fuel pump 11 supplies fuel to the cylinders of an engine 12 in turn, the fuel pump being driven in a conventional manner, with the timing of injection controlled in the usual way. The driving of the fuel pump forms no part of the present invention and is not therefore described. Moreover, the type of pump used is not critical, but in the example shown the pump is a conventional in-line pump having a control rod 14 the axial position of which determines the rate of supply of fuel to the engine 12 by the pump 11. The axial position of the control rod 14 is controlled by an electro-mechanical actuator 13 to determine the pump output.

Figure 3:
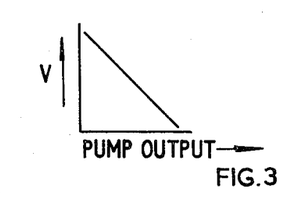
Figure 4:
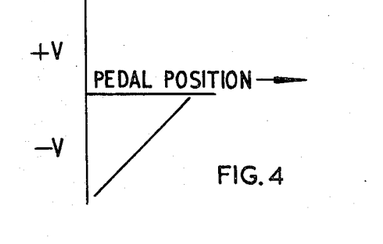

The system further includes three transducers 15, 16 and 17. The transducer 15 produces an output in the form of a voltage shown in FIG. 2, the magnitude of the voltage being dependent on the rotational speed of the engine. The transducer 16 produces an output voltage shown in FIG. 3 the voltage being dependent on the rate of supply of fuel to the engine, (i.e. the pump output). For this purpose the transducer 16 conveniently senses the axial position of the control rod 14 as indicated by the dotted line. The transducer 17 produces a voltage representing demand. Typically, the transducer 17 is controlled by the accelerator pedal of the vehicle which is driven by the engine, and in the particular example being described, the engine is controlled by an all-speed governor, so that the output from the transducer 17 is a voltage representing demanded engine speed. The form of this voltage is shown in FIG. 4, and it should be noted that the slope of this output is opposite to the slopes of the outputs from the transducers 15, 16.

The outputs from the transducers 15, 16 and 17 are all applied, by way of resistors 15a, 16a, 17a converting the signals to current signals, to the inverting terminal of an operational amplifier 18, connected as a summing amplifier, whilst the output from the transducer 16 is also connected through a resistor 16b to the inverting terminal of an operational amplifier 19 connected as a summing amplifier. The amplifiers 18 and 19 are powered by positive and negative supply terminals 21, 22 and have their non-inverting terminals connected to a terminal 23 which is at a reference potential intermediate the potentials of the terminals 21, 22. The output from the amplifier 18 is fed through a diode 24 to a drive circuit 25 which incorporates a power amplifier and which serves to control the electro-mechanical actuator 13. Similarly, the output terminal of the amplifier 19 is connected to the drive circuit 25 through a diode 26. The diodes 24 and 26 together constitute a discriminator, which ensures that only the amplifier 18, 19 producing the more positive output is coupled to the drive circuit 25 at any given instant. Thus, if the amplifier 18 is producing the more positive output, then the diode 26 is reverse biased, and if the amplifier 19 is producing the more positive output, the diode 24 is reverse biased. FIG. 1 also shows the feedback resistors 27, 28 associated with the amplifiers 18, 19 respectively, and it will be noted that the feedback circuit for each amplifier is taken from the input terminal of the drive circuit 25. By virtue of this arrangement, the effect of the forward voltage drop across the diodes 24 and 26 is reduced by a factor dependent upon the amplifier open-loop gain, and so the temperature characteristics of the diodes become negligible when considering the temperature characteristics of the system. Also, there is a very sharp changeover from control by one amplifier to control by the other amplifier.

Figure 2:
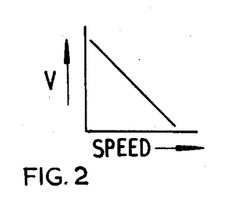
FIGS. 2 to 4 are graphs illustrating the outputs of three transducers used in FIG. 1.

There are various other controls in FIG. 1, the purpose of which will be described later. However, the basic operation is as follows. Neglecting for the moment the input to the inverting terminal of the amplifier 18 from the transducer 16, then the amplifier 18 receives a current input representing demanded speed, and a current input representing actual speed. These inputs are of opposite polarity as seen in FIGS. 2 and 4. If the actual speed is less than the demanded speed, then the amplifier 18 produces an output which is fed to the drive circuit 25, and causes the pump output to increase so that the engine speed increases. As the demanded and actual signals approach one another, the output from the amplifier 18 becomes such that the drive circuit 25 produces just sufficient current to keep the control rod 14 in the position it has assumed. This simple explanation, however, ignores the input from the transducer 16, which modifies the operation to provide the required engine characteristics in a manner to be explained in more detail later. It will be seen that by virtue of the input from the transducer 16, the amplifier 18 will in fact compare the demanded speed and the actual speed, and change the rate of supply of fuel until these two parameters have a relative value which is determined by the pump output.

The amplifier 19 receives a signal by way of the resistor 16b representing pump output and also receives a reference current from a reference source 20. If the pump output exceeds a predetermined value, then the amplifier 19 produces a positive output which is more positive than the output of the amplifier 18, so that the diode 24 ceases to conduct as previously explained, and the amplifier 19 produces an output to the drive circuit 25. It should be noted that a larger positive output from the amplifier 19 than from the amplifier 18 is in fact a demand for less fuel, that is to say there is an inverting stage between the amplifier and pump. When the amplifier 19 is producing an output, the system operates in the same way as when the amplifier 18 is producing an output to reduce the output of the amplifier 19 to a value such that the output from the drive circuit 25 keeps the control rod 14 in the position it has assumed. The system will stay in this condition until the amplifier 18 demands less fuel than the maximum set by the amplifier 19. When the amplifier 18 demands less fuel, it produces a greater positive output than the amplifier 19, and so takes over the operation.

Figure 5:
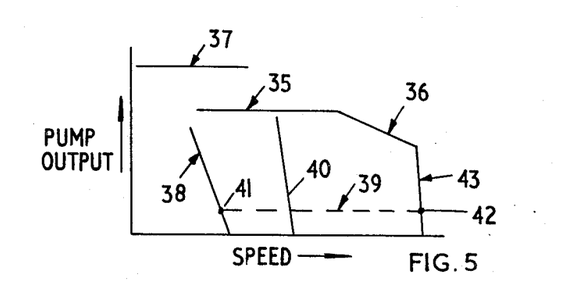
FIG. 5 represents a fuel-speed characteristic for an engine to be controlled by the arrangement of FIG. 1.

Referring now to FIG. 5, the way in which the governor is designed and operates can be seen from the graph of pump output against speed. This graph also shows the effect of a number of controls not yet mentioned in relation to FIG. 1. The line 40 is set by the amplifier 18 by virtue of the way in which the comparison of actual and demanded speeds is modified in accordance with the input from the transducer 16. The line 40 in the drawings represents 50% demand, and is one of a family of curves stretching from 0% demand to 100% demand. The extremes of this curve, that is to say no demand and full demand, are indicated at 38 and 43. The curve 38 is set by a current source 31 providing an input to the inverting terminal of the amplifier 18, to ensure that the engine speed varies with pump output in the manner indicated by the curve 38 even when the demand is zero. The maximum speed is set by a control 29 shown in FIG. 1 and which acts by limiting the maximum demand from the transducer 17.

The line 35 is the maximum fuel line which is set by the amplifier 19 as previously explained. This line has a portion 36 which is set by a circuit known as a torque control circuit 32. This torque control circuit 32 modifies the maximum permitted fuel under certain conditions of engine speed, as will be explained in more detail later. Also, there is shown in FIG. 5 a curve 37 which is under the control of an excess fuel control 33 shown in FIG. 1. In certain circumstances when an attempt is made to start the engine the control 33 allows a substantially increased pump output as indicated by the curve 37. There is also a control 34 in FIG. 1 which modifies the maximum permitted fuel in accordance with air density or air pressure or air temperature or any combination of these three parameters. The control 34, when operative modifies the input current to the amplifier 19, and so changes the position of the lines 35, 36 on the vertical axis, that is to say it lifts both lines up and down dependent upon air conditions. The reason for this is that basically the maximum fuel line 35, 36 is set to prevent excess pollution as a result of the engine receiving too much fuel. The maximum amount of fuel that the engine can burn depends on the amount of air entering the engine, which is dependent on the three air parameters mentioned above. In a turbo-charged engine it is often sufficient to measure the air pressure, and operate the control 34 in accordance with the air pressure.

The boundary line 39 is a function of the engine, not the governor, and represents the no-load fuel requirements of the engine under different demands, so that the points 41 and 42 are the no-load engine speeds at zero and full demand, (i.e.) with the pedal released and fully depressed respectively.

FIG. 5 explains how the engine will behave in any circumstances. Suppose that the pedal has been set to demand 50%, corresponding to the line 40 shown in FIG. 5. The exact position on the line 40 at any given instant will depend upon the load on the engine, and so for this given setting of the pedal, the engine speed can vary within the limits set by the lines 35 and 40. The slope of the line 40 is, as previously explained, a result of the input to the amplifier 18 from the transducer 16. Assuming that the engine is operating at a particular point on the line 40, then if the vehicle starts to go up an incline, the load will increase, and so for a given position of the pedal the operating point will move up the line 40, so that the speed is reduced. If the load becomes sufficiently great, the line 35 will be reached, and no further increase in pump output will be permitted. At this point, the speed falls rapidly. If the load decreases, then the operating point moves down the line 40 with the corresponding increase in speed. If the load decreases to zero, the line 39 is reached.

If the demand is changed, then assuming for the sake of argument that it changes from 50 demand to 100% demand, the pump output will increase as rapidly as the pump will allow until the line 35 is reached, and the engine will then move along the lines 35, 36 onto the maximum demand line 43, and will assume a position the line 43 which is dependent upon the load.

If the demand is reduced, then assuming the demand is reduced from 50 to 0%, the operating point will move vertically downwards until the fuel supply is zero. The speed then decreases until the line 38 is reached, after which the operating point moves up the line finishing at a point on the line 38 determined by the load on the engine.

Figure 6:
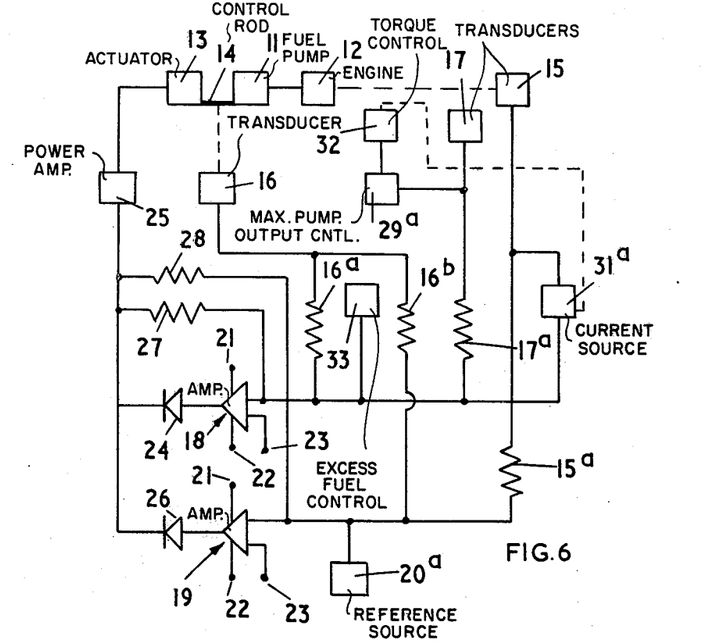
FIG. 6 is a view similar to FIG. 1 of a second example of the invention.
Figure 7:
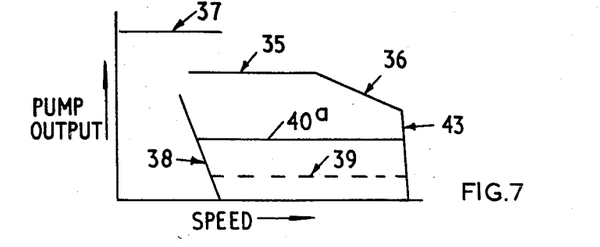
FIG. 7 is a view similar to FIG. 5 but showing the characteristic obtained by FIG. 6.

Turning now to FIG. 6, there is shown a second example in which the governor is a two-speed governor, that is to say a governor in which the demand signal is a fuel signal which is compared with the actual fuel, the pump output then being modified to provide the desired fuel output. In FIG. 6, the amplifier 18 receives a signal from the transducer 16 by way of the resistor 16a, this signal representing actual fuel. A signal representing demanded fuel is fed by way of the resistor 17a to the amplifier 18, but it will be noted that there is no speed term set to the amplifier 18 from the transducer 15. The characteristics of the system are shown in FIG. 7. The line 40a is one of a family of horizontally extending lines which are set by the governor, and can be taken to represent the 50% demand line. When the pedal sets a demand of 50%, the amplifier 18 sets the required fuel level. The operating point on the line 40a will of course then depend on the load on the engine.

The amplifier 19 overrides the amplifier 18 in FIG. 6 in a similar manner to the arrangement in FIG. 1, except that the amplifier 19 now receives a signal by way of the resistor 15a representing speed, and also a reference current from a source 20a indicating the maximum engine speed. The amplifier 19 sets the maximum speed of the engine, which is indicated by the line 43 in FIG. 7. It will be noted that the line 43 has a slope, that is to say the maximum permitted speed varies with pump output. This slope is obtained by feeding to the amplifier 19 a signal representing pump output, this signal being fed by way of the resistor 16b.

The maximum pump output, that is to say the line 35 in FIG. 7, is set by a control 29a which limits the maximum demand, in much the same way as the control 29 limits the maximum speed in FIG. 1. The torque control circuit, which provides the required slope 36 in FIG. 7, could act directly on the input to the amplifier 18, but preferably it serves as shown to act on the control 29a the torque control circuit being shown at 32.

The excess fuel line 37 is obtained by a current source 33 acting on the amplifier 18. Finally, the minimum engine speed, indicated by the line 38, is set by a current source 31a, which is similar to the current source 31 except that because the current source 31a acts on the amplifier 18, which does not receive a speed term, the current source 31a must receive a speed term as indicated by its connection to the transducer 15. The dotted line in FIG. 6 indicates that when the source 31a is operative, it modifies the output of the transducer 32 to keep the line 35 in its correct position.

Figure 8:
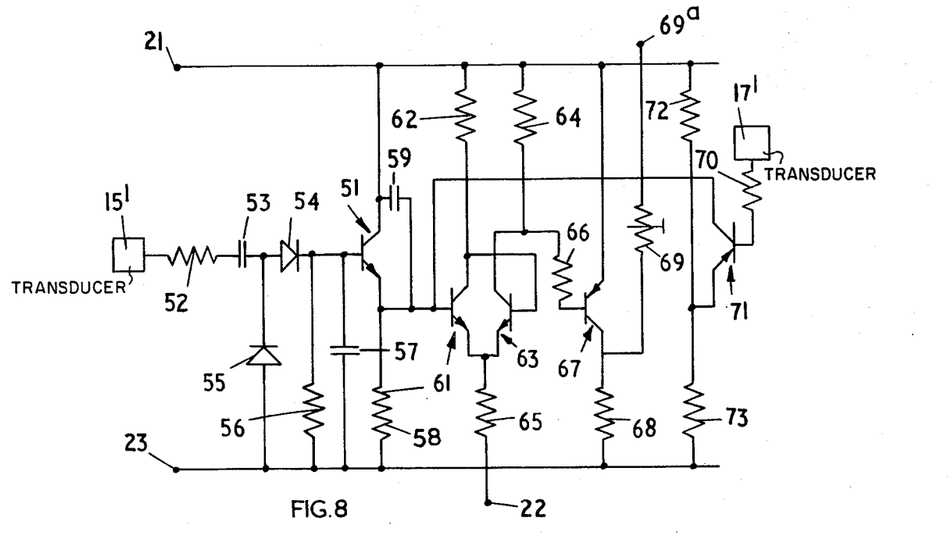
FIG. 8 is a circuit diagram showing an excess fuel control circuit.

Referring now to FIG. 8, there is illustrated one example of an excess fuel control to produce the line 37 in FIG. 5 or FIG. 7. The terminals 21, 22 and 23 are used in the circuit, the terminal 23 being at a potential intermediate the terminals 21 and 22, and ideally being halfway between the potentials of the terminals 21 and 22. FIG. 8 also shows a transducer 15¹. The transducer 15 in FIG. 1 produces a d.c. voltage representing engine speed as shown in FIG. 2, but in practice this is accomplished by producing an a.c. voltage at a frequency representing engine speed, and feeding this a.c. voltage to a frequency to voltage converter to produce the required d.c. voltage output. The transducer 15¹ in FIG. 8 represents the part of the transducer 15 which produces an alternating voltage at a frequency dependent on engine speed.

The output from the transducer 15¹ is fed to the base of an n-p-n transistor 51 by way of a series circuit including a resistor 52, a capacitor 53 and a diode 54. The junction of the capacitor 53 and diode 54 is connected through a diode 55 to the terminal 23, and the base of the transistor 51 is connected to the terminal 23 through a resistor 56 and a capacitor 57 in parallel, the transistor 51 has its collector connected to the terminal 21 and its emitter connected through a resistor 58 to the terminal 23, the emitter and collector of the transistor 51 being interconnected through a capacitor 59, and the emitter being further connected to the base of an n-p-n transistor 61 having its collector connected through a resistor 62 to the terminal 21. A further n-p-n transistor 63 has its collector connected through a resistor 64 to the terminal 21, and the emitters of the transistors 61, 63 are connected through a resistor 65 to the terminal 22. The base of the transistor 63 is connected to the collector of the transistor 61, and the collector of the transistor 63 is connected through a resistor 66 to the base of a p-n-p transistor 67, the emitter of which is connected to the terminal 21 and the collector of which is connected through a resistor 68 to the terminal 23, and through a pre-set resistor 69 to an output terminal 69a which is connected to the summing terminal of the amplifier 19 if the arrangement is used with FIG. 1, or to the summing terminal of the amplifier 18 if the arrangement is used with FIG. 6.

The base of the transistor 61 is further connected to the collector of a p-n-p transistor 71. The base of the transistor 71 is connected through a resistor 70 to a transducer $17^1$, and its emitter is connected to the junction of a pair of resistors 72, 73 connected in series between the terminals 21, 23. The transducer $17^1$, is the transducer 17 plus a constant voltage bias causing the transducer to produce a positive output increasing with pedal movement from zero to a maximum.

While an attempt is made to start the engine, the engine speed will be low. The diode pump circuit 52 to 57 produces across the capacitor 57 a voltage dependent upon the speed of the engine, and the transistor 51 acts as an emitter follower to apply this voltage to the base of the transistor 61. While the engine speed is low then the transistor 61 is off, and the transistor 63 is on. The transistor 63 provides base current to the transistor 67 which conducts to provide an input to the summing junction of the amplifier 19 or 18, so that the amplifier 19 or 18 permits excess fuel to be supplied to the engine 12, the amount of the excess being determined by the resistor 69. When the datum speed is reached, however, the transistor 61 turns on, turning off the transistors 63 and 67 so that the amplifier 19 or 18 again controls the maximum fuel as previously explained with reference to FIGS. 1 and 6.

When the engine speed is decreasing, it is important not to provide excess fuel between the datum speed and the cranking speed of the engine. The bistable circuit constituted by the transistors 61 and 63 will of course have a differential, that is to say it will switch from a first state to a second state at one voltage, but only revert to the first state at a lower voltage. The design of the bistable circuit is such that although the transistor 61 turns on at the datum speed, it does not turn off again until the engine speed falls below cranking speed, so that excess fuel is not provided while the engine speed is reducing from the datum speed to the cranking speed.

A minor difficulty with the arrangement thus far described is that if, while the engine speed is reducing from the datum speed to the cranking speed, the supply to the terminals 21, 22, 23 is momentarily cut-off and then re-established, the transistor 61 turns off and stays off so that excess fuel would be provided between the datum and cranking speeds. The capacitor 59 prevents this possibility by ensuring that every time the supply is connected, the transistor 61 turns on and remains on for a period of time while the capacitor 59 charges.

The above discription ignores the transistor 71, which is particularly desirable when the engine is used to drive a road vehicle. In these circumstances, the transistor 71 ensures that excess fuel is not available unless the accelerator pedal of the vehicle is depressed beyond a predetermined position before an attempt is made to crank the engine, and is left in that position while the engine is being cranked. The arrangement is such that unless the pedal is depressed sufficiently the transistor 71 is on. Whenever the transistor 71 is on, it provides base current for the transistor 61, holding the transistor 61 conductive so that the transistors 63 and 67 are off and excess fuel cannot be provided.

In a modification, excess fuel is only permitted if the engine temperature is below a predetermined value. Alternatively, both the pedal and the temperature may be sensed, so that excess fuel is only provided if the pedal is depressed beyond the predetermined position and the engine temperature is below the predetermined temperature.

Figure 9:
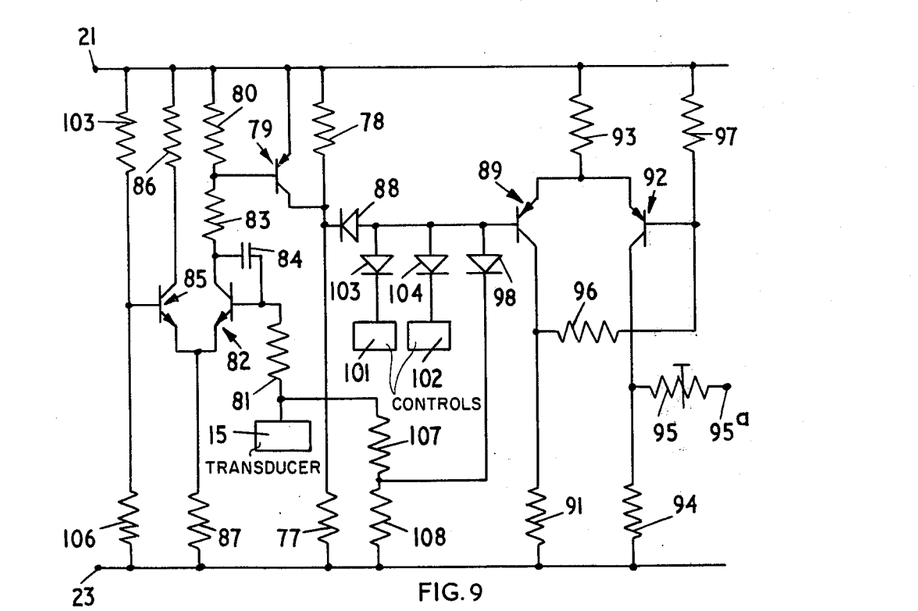
FIG. 9 is a circuit diagram illustrating another form of excess fuel control circuit.

Referring now to FIG. 9, there is shown a second form of excess fuel circuit. The circuit receives an input from the transducer 15, as distinct from the transducer $15^1$ in FIG. 8, and provides an output in the form of a current to a terminal 95a which can be connected to the amplifier 19 or the amplifier 18 depending upon whether the arrangement is to be used with the example of FIG. 1 or the example of FIG. 6.

Referring to FIG. 9, the transducer 15 provides an input by way of a resistor 81 to the base of an n-p-n transistor 82 having its collector connected through resistors 83, 80 in series to the terminal 21, and its collector-base junctions interconnected through a capacitor 84. The emitter of the transistor 82 and the emitter of a further n-p-n transistor 85 are connected through a resistor 87 to the terminal 23, and the base of the transistor 85 is connected to the junction of a pair of resistors 105, 106 connected in series between the terminals 21, 23. The collector of the transistor 85 is connected to the terminal 21 through a resistor 86.

The junction of the resistors 80, 83 is connected to the base of a p-n-p transistor 79 having its emitter connected to the terminal 21 and its collector connected to the junction of a pair of resistors 78, 77 which are connected in series between the lines 21, 23.

The circuit further includes a pair of p-n-p transistors 89, 92 having their emitters connected to the terminal 21 through a resistor 93, and their collectors connected to the terminal 23 through resistors 91, 94 respectively. The collector of the transistor 89 is connected to the terminal 21 through a resistor 96 and a resistor 97 in series, and the junction of the resistors 96, 97 is connected to the base of the transistor 92, which has its collector connected through a pre-set resistor 95 to the terminal 95a. The transistor 89 receives an input at its base by way of a diode 88 from the collector of the transistor 79, further inputs by way of diodes 103, 104 from controls 101, 102, and a fourth input by way of a diode 98 from the junction of a pair of resistors 107, 108 connected between the output of the transducer 15 and the terminal 23.

The transistors 89, 92 constitute a bistable circuit having a first state in which the transistor 89 conducts and a second state in which the transistor 92 conducts. In the second state, a signal is fed by way of resistor 95 to the summing terminal of the amplifier 19 or 18 to increase the maximum fuel limit during starting.

Ignoring for the moment the diode 88, the bistable circuit is driven to its second state only when it receives no input through any of the diodes 98, 103, 104. The control 101 is sensitive to the position of the accelerator pedal, and the control 102 is sensitive to the engine temperature. The source 101 produces no signal only when the accelerator pedal is depressed beyond a predetermined position, and the source 102 produces no signal only when the engine temperature is low. The resistors 96, 97 are adjusted so that there is no signal by way of the diode 98 only when the engine speed is below a datum speed. Thus, if the engine speed is below a datum speed, the engine is cold and the accelerator pedal is full depressed, then the transistor 89 switches on and excess fuel is permitted. If the engine speed is above the datum speed, or the accelerator pedal is not depressed, or the engine temperature is above a predetermined value, then the transistor 89 is turned on and the transistor 92 is off so that no excess fuel is permitted.

With the arrangement so far described, it will be possible for excess fuel to be provided between datum and cranking speeds as the engine speed is reducing. The purpose of the diode 88 is to prevent this occurrence. The amplifier 85, 82 controls the conduction of the transistor 79. At low engine speeds, the output voltage of the transducer 15 is high (see FIG. 2) and so the transistors 82, 79 are on and the diode 88 is reverse biased. At cranking speed, the transistor 85 conducts sufficiently to reduce the conduction level of the transistors 82, 79 so that the diode 88 is no longer reverse biased.

When the diode 88 is conducting, it provides an input to the bistable circuit which ensures that once the bistable circuit is in its first state, it cannot be driven to its second state, until the diode 88 stops conducting. Thus, assuming that excess fuel has not been permitted when the diode 88 conducts, then the bistable circuit will be in its first state and will stay in its first state until the diode 88 ceases to conduct. However, if when the diode 88 conducts the bistable circuit is already in its second state, so that excess fuel is being provided the diode 88 will not switch the circuit back to its first state, but when the datum speed is reached and the circuit is switched back to its first state, the diode 88 holds it in the first state until cranking speed is reached, and the diode 88 is reverse biased.

Figure 10:
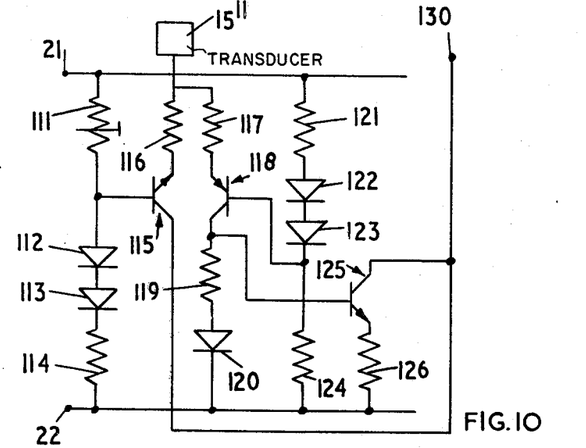
FIG. 10 is a circuit diagram illustrating one form of torque control circuit.

Referring now to FIG. 10, there is shown one form of torque control circuit for modifying the maximum fuel characteristics in accordance with speed. Connected in series between the terminals 21, 22 are a pre-set resistor 111, a pair of diodes 112, 113 and a resistor 114. The junction of the resistor 111 and diode 112 is connected to the base of a n-p-n transistor 115, the emitter of which is connected through a resistor 116 to a transducer 15″, which is the transducer 15 with a constant negative bias so that the output is zero at zero speed and then increases negatively. The transducer 15″ also provides an input by way of a resistor 117 to the emitter of a p-n-p transistor 118, the collector of which is connected to the terminal 22 through a resistor 119 and the diode 120 in series. The terminals 21, 22 are bridged by a series circuit including a resistor 121, diodes 122, 123 and a resistor 124, and the junction of the diode 123 and resistor 124 is connected to the base of the transistor 118. The collector of the transistor 118 is also connected to the base of an n-p-n transistor 125, the emitter of which is connected through a resistor 126 to the terminal 22. The collectors of the transistors 115, 125 are connected to a terminal 130 which in the case of FIG. 1 is connected to the summing input of the amplifier 19, but in the case of FIG. 6 is arranged to modify the control 29*a* as previously explained.

Figure 11:
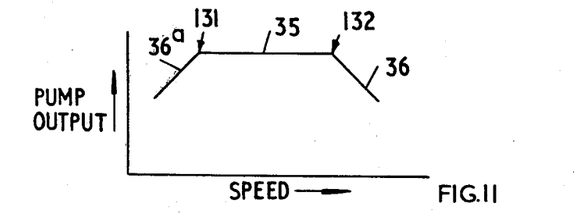
FIG. 11 is a graph showing the fuel-speed relationship obtained with the circuit shown in FIG. 10.

The arrangement of FIG. 10 is designed to give a maximum fuel against speed characteristic of the form shown in FIG. 11. It will be seen that this curve differs from FIGS. 5 and 7 in that as well as the parts 35, 36 of the curve, there is a portion 36*a* at low speeds where the maximum fuel is also reduced. In order to understand the operation of FIG. 10, it is convenient to consider a situation where the speed of the engine lies between the values indicated by the points 131 and 132 in FIG. 11. The transducer 15″ produces an output in the form of a voltage which decreases relative to the terminal 23 with engine speed. Thus, when the engine speed is low, the output from the transducer 15 is relatively low negative and the output will increase negatively passing through a first known value when the engine speed is at the point 131, and then passing through a second known value when the engine speed is at the point 132. The base potential of the transistor 115 is set by the series circuit 111, 112, 113, 114 at the second known value, and the base potential of the transducer 118 is set by the series circuit 121, 122, 123, 124 at the first known value. Thus, on the portion of the curve indicated at 35, that is to say between the two engine speeds represented by the points 131 and 132, neither the transistor 115 or the transistor 118 will be conductive. In these circumstances, the maximum fuel available is indicated by the portion 35 of the curve in FIG. 11.

Imagine now a situation in which the engine speed increases to the point 132 shown in FIG. 11. As the engine speed increases, the output voltage of the transducer 15″ increases negatively until at a speed indicated by the point 132, the emitter potential of the transistor 115 is less than its base potential, and so the transistor 115 starts to conduct and takes from the regulator a collector current dependent on speed, so that the maximum fuel is reduced in the manner indicated by the portion 36 of the curve in FIG. 11.

Consider now the situuation where the engine speed falls to the point indicated by 131 in FIG. 11. With falling engine speed, the output voltage of the transducer 15″ reduces negatively until at the point 131, the emitter potential of the transistor 118 becomes greater than its base potential, so that the transistor 118 conducts. Current flowing through the transistor 118 turns on the transistor 125, which removes current from the terminal 130 and it will be seen that the curve will follow the portion 36*a* shown in FIG. 11 as the speed reduces still further.

It will be appreciated that in effect the transistors 115 and 118 and their associated components are acting as pre-set and temperature stable Zener diodes sensing the speeds indicated by the points 132 and 131 and then providing the required shaping of the curve.

Figure 12:
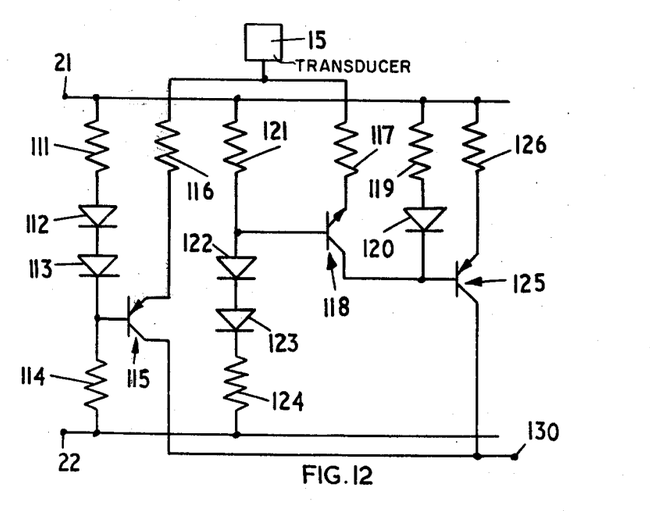
FIG. 12 is a circuit diagram illustrating another form of torque control circuit.

It will of course be appreciated that the example described can be modified in a number of ways. For example, depending on the type of engine employed modification of the maximum fuel may only be required below the speed indicated by the point 131, or above the speed indicated by the point 132. Also, the curves 36*a* and 36 in the example both indicate decreasing maximum fuel, but in some cases increasing maximum fuel may be desired for one or both portions of the curve. Such an arrangement can readily be achieved using the circuit described with minor modifications. Thus, as shown in FIG. 12, the circuit can be modified so that the transistor 115 is a p-n-p transistor with its base connected to the junction of the diode 113 and the resistor 114. In similar fashion, if it is desired that the portion 36 of the curve represents an increasing maximum fuel, then as shown in FIG. 12 the transistor 118 is replaced by an n-p-n transistor having its base connected to the junction of the resistor 121 and the diode 122 and its collector connected to the terminal 21 through the diode 120 and resistor 119. In this case, the transistor 125 is a p-n-p transistor with its emitter connected through the resistor 126 to the terminal 21 and its collector connected, together with the collector of the transistor 115, to the amplifier 19. It will be noted that the polarities are such that FIG. 12 requires an input from the transducer 15, not the transducer 15''.

In both FIGS. 10 and 12, modification of the maximum fuel is effected in a linear manner, but clearly non-linear modification of the fuel is possible using a suitable control circuit.

Figure 13:
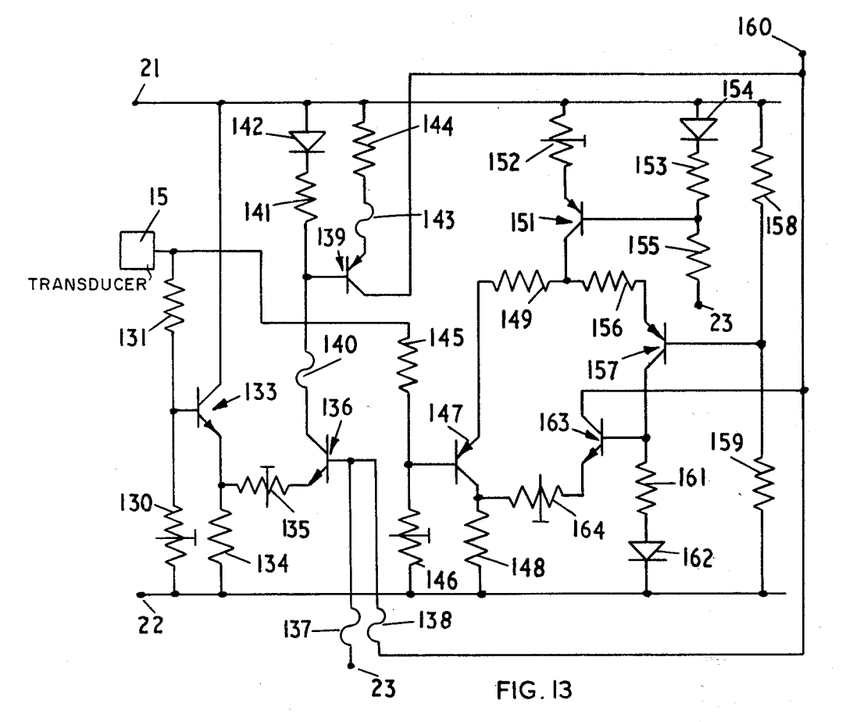
FIG. 13 is a circuit diagram illustrating a third form of torque control circuit.

Referring to FIG. 13, which shows another form of torque control circuit, the output from the transducer 15 is fed through a resistor 131 and a pre-set resistor 130 in series to the terminal 22, the junction of the resistors 131, 132 being connected to the base of an n-p-n transistor 133 and its collector connected to the terminal 21 and its emitter connected through a resistor 134 to the terminal 22. The emitter of the transistor 133 is further connected through a pre-set resistor 135 to the emitter of an n-p-n transistor 136, the base of which is connected through a detachable link 137 to the terminal 23, and through another detachable link 138 to an output terminal 160 for connection to the summing terminal of the regulator in the same way as the terminal 130 in FIGS. 10 and 12. The collector of the transistor 136 is connected through a detachable link 140 to the base of a p-n-p transistor 139, and is also connected to the terminal 21 through a resistor 141 and a diode 142 in series. The transistor 139 has its collector connected to the output terminal 160 and its emitter connected to the terminal 21 through a detachable link 143 and a resistor 144 in series.

The transducer 15 also provides an output which is coupled to the terminal 22 through a resistor 145 and a pre-set resistor 146 in series, the junction of the resistors 145, 146 being connected to the base of a p-n-p transistor 147. The transistor 147 has its collector connected to the terminal 22 through a resistor 148 and its emitter connected through a resistor 149 to the collector of a p-n-p transistor 151 having its emitter connected through a pre-set resistor 152 to the terminal 21. The base of the transistor 151 is connected through a resistor 153 and a diode 154 in series to the terminal 21, and is further connected through a resistor 155 to the terminal 23. The collector of the transistor 151 is further connected through a resistor 156 to the emitter of a p-n-p transistor 157 having its base connected to the junction of a pair of resistors 158, 159 connected in series between the terminals 21, 22 and its collector connected through a resistor 161 and a diode 162 in series to the terminal 22. The collector of the transistor 157 is also connected to the base of an n-p-n transistor 163, the collector of which is connected to the output terminal 160 and the emitter of which is connected through a pre-set resistor 164 to the collector of the transistor 147.

Figure 14:
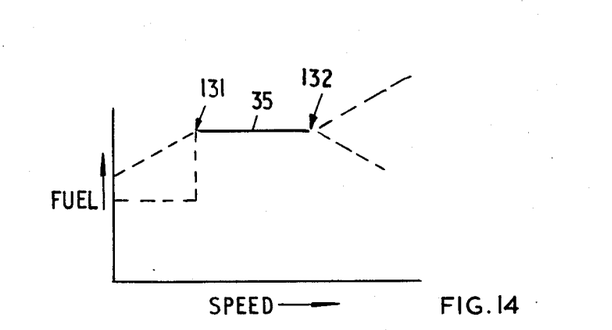
FIG. 14 is a graph illustrating the characteristics obtained with the circuit of FIG. 13.

The transistors 133, 136, 139 and their associated components are designed to give the required fuel shaping above the speed indicated by the point 132 in FIG. 14. Assume for the moment that the upwardly inclined line is required in the characteristics, then the link 138 is removed from the circuit. As long as the engine speed is below the point 132 in FIG. 14, the output from the transducer 15 is sufficient to hold the transistor 133 on, and so the transistor 136 is off. However, at the point 132, conduction of the transistor 133 decreases sufficiently for the transistor 136 to turn on and provide base current to the transistor 139, which turns on to provide current to the terminal 160. As the speed increases further, the transistor 133 conducts less, and the transistors 136, 139 conduct more to provide the desired characteristic.

Assume now that the downwardly inclined dotted line is required, then the links 137, 140, 143 are removed from the circuit. The transistor 133 still behaves in the same way, but at the point 132 base-emitter current flows in the transistor 136 by way of the link 138, drawing current from the terminal 160. As conduction of the transistor 133 decreases further, more current is drawn through the base-emitter of the transistor 136, although of course the transistor 136 does not conduct in its collector since the link 140 is removed. It will be seen that a downwardly inclined characteristic is now obtained. In both arrangements, the resistors 130, 135 set the desired slopes of the dotted lines and the point 132.

Turning now to the other half of the circuit, the transistors 147, 157 constitute a long tail pair having a constant current source in the tail, this constant current source being constituted by the transistor 151. At speeds above the point 131 in FIG. 14, the transistor 147 is conducting a substantial current, and the transistor 157 is conducting very little current so that the transistor 163 is off. As the speed reduces and the point 131 is reached, then the conduction of the transistor 147 reduces to a point at which the correspondingly increased conduction of the transistor 157 is such that the transistor 163 is not on, but is about to come on. At this stage, the transistors 147, 157 are conducting equally. any further reduction in speed reduces the conduction of the transistor 147 further, and the transistor 157 increases its conduction, turning on the transistor 163, which removes current from the terminal 160. The resistor 164 sets the slope of the curve at speeds lower than the point 131, and two possible slopes are shown in FIG. 14, one nearly vertical, and one at a small angle to the horizontal. It will be noted that the nearly vertical sloped curve strikes a horizontal curve, which represents the minimum permitted value of the maximum fuel which is set by the circuit. This line corresponds to complete switch-off of the transistor 147. It will be clear that this limit will only be reached if the slope is sufficiently steep for the fuel to be decreased sufficiently before the speed reduces to zero. The point 131 is set by the resistor 136.

By reversing the two parts of FIG. 13 and making minor polarity attention the low speed dotted lines and the high speed dotted lines of FIG. 14 can be interchanged.

Figure 15:
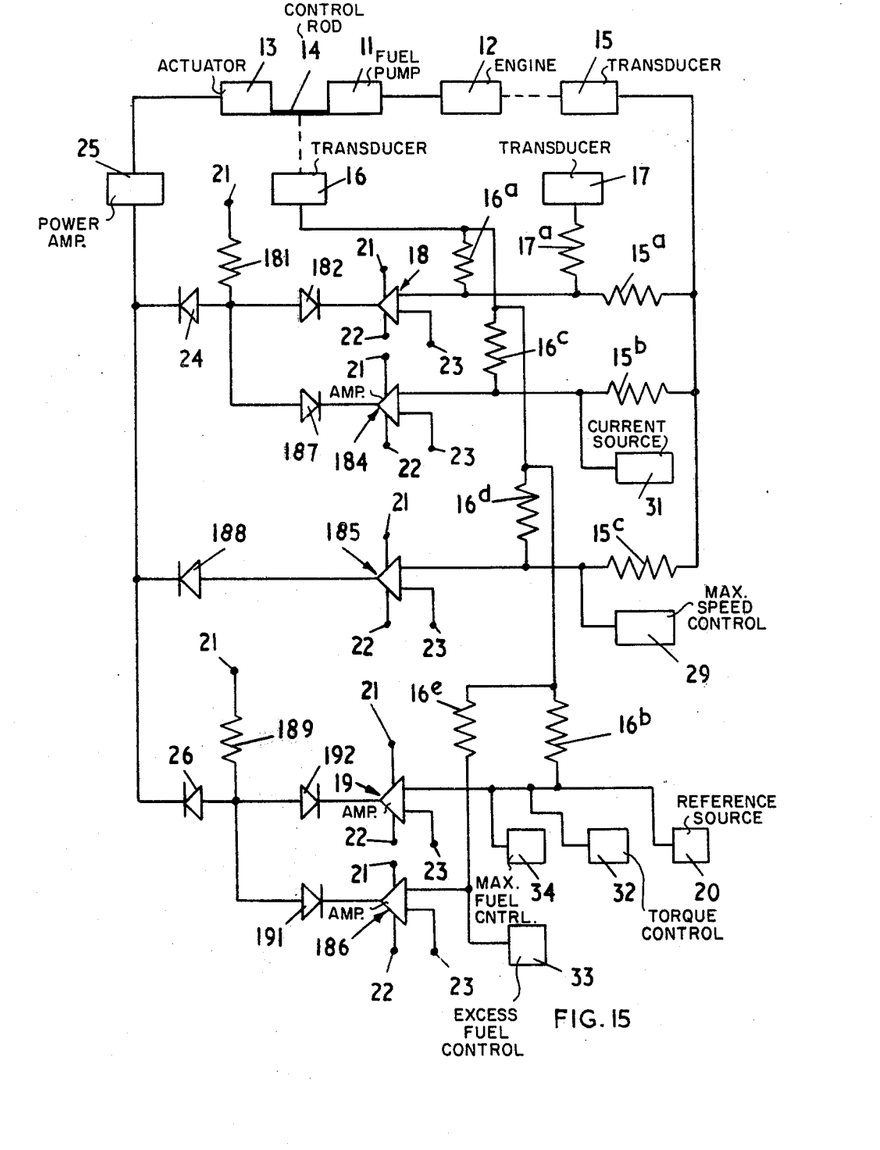
FIG. 15 is a circuit diagram showing a modification of the arrangement shown in FIG. 1.

Referring now to FIG. 15, the arrangement shown operates in a similar manner to the arrangement of FIG. 1, but the parts are arranged differently. In FIG. 1, the amplifier 18 is responsive to the three basic system parameters, and also to two subsidiary controls from controls 29, 31. In FIG. 15, the controls 29, 31 do not influence the amplifier 18. However, associated with the amplifier 18 is an amplifier 184 which receives signals from the transducer 16 by way of a resistor 16c, from the transducer 15 by way of a resistor 15b, and from the control 31. The outputs from the amplifiers 18, 184 are fed through a pair of diodes 182, 187 to the diode 24, and the junction of the diodes 24, 182, 187 is connected to the terminal 21 through a resistor 181.

The control 29 now provides an input to the summing junction of an amplifier 185, which also receives an input by way of a resistor 16d from the transducer 16 and by way of a resistor 15c from the transducer 15.

The amplifier 19 is the same as in FIG. 1 except for the control 33, which now provides an input to an amplifier 186 which also receives an input by way of a resistor 16e from the transducer 16. The outputs from the amplifiers 19, 186 are fed by way of diodes 192, 191 to the diode 26, and the junction of the diodes 26, 191, 192 is connected to the terminal 21 through a resistor 189. Moreover, although none of the feedback connections to the five amplifiers are shown in FIG. 15, these connections are all taken from the input to the drive circuit 25, for the reasons previously explained.

The arrangement is such that at any given instant only one of the diodes 24, 188, 26 can be conducting. Moreover, if the diode 24 is operative, then either the amplifier 18 or the amplifier 184 is operative by virtue of the diodes 182, 187. Similarly, if the diode 26 is operative, then either the amplifier 19 or the amplifier 186 is operative, by virtue of the diodes 192, 191.

Assuming that the diode 24 is conducting, then the amplifier 18 operates in the manner described with reference to FIG. 1. However, if at any time the amplifier 18 demands a speed less than the minimum speed set by the regulator, then the amplifier 184 produces an output, reverse biasing the diode 182 so that the output by way of the diode 24 is controlled by the amplifier 184.

If at any time a speed greater than the maximum engine speed is demanded, then the amplifier 185 produces an output, reverse biasing the diodes 24, 26 and controlling the engine.

The amplifier 19 operates in the manner described with reference to FIG. 1, except that excess fuel is provided by way of the amplifier 186. When excess fuel is demanded, then the amplifier 186 produces an output reverse biasing the diode 192.

It will readily be appreciated that the various components can be re-arranged in a number of different ways. In particular, the arrangement of FIG. 15 can readily be adapted to operate as a two-speed governor simply by omitting connection through the resistor 15a. In such an arrangement, the transducer 17 would of course demand fuel, not speed.

In all the examples shown, the transducer 15 conveniently comprises an a.c. generator driven by the engine and producing an output at a frequency proportional to engine speed, this output being fed to a diode pump circuit which produces an output voltage dependent upon engine speed. The transducer 16 can be in the form of a transformer having an oscillator coupled to its primary winding, and means whereby the position of the control rod 14 determines the coupling between the primary and secondary windings. Detection means is then incorporated in the transducer to measure the amplitude of the signal in the secondary winding, and so produce an output voltage representing the position of the rod 14. A similar arrangement can be used in connection with a demand transducer, where the coupling is varied by the pedal position.

In some cases, it may be desirable to include a capacitor in the resistive feedback circuit of one or more of the amplifiers, so as to increase or otherwise modify the d.c. gain of the amplifier and so improve stability.

We claim:
1. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, and further including a second summing amplifier which receives an input representing the pump output and also a reference input, and a discriminator coupling the first-mentioned and the second summing amplifiers to the pump control means, the output from the discriminator at any given instant being the output from the summing amplifier which demands the least fuel, so that the second summing amplifier limits the maximum pump output.

2. A system as claimed in claim 1 including means for limiting the maximum speed of the engine.

3. A system as claimed in claim 2 in which said means acts by restricting the demand signal to a predetermined level.

4. A system as claimed in claim 1, including a third summing amplifier to which are fed electrical signals representing a system parameter and a reference, the third amplifier being connected to the pump control means through said discriminator, so that in certain conditions the third amplifier only controls the pump.

5. A system as claimed in claim 4, including a further amplifier which receives an electrical signal representing a system parameter, and limits the value of said parameter under certain system conditions, and a second discriminator coupling the first and said further amplifier to the pump control means by way of the first-mentioned discriminator, whereby when the first discriminator couples the second discriminator to the pump control means, then the second discriminator couples to the pump control means either the first or said further amplifier.

6. A system as claimed in claim 4, including an additional amplifier which under certain system conditions modifies said maximum value of said further system parameter, and an additional discriminator coupling the second and additional amplifier to the pump control means by way of the first mentioned discriminator, whereby when the first discriminator couples the additional discriminator to the pump control means, then the additional discriminator couples to the pump control means either the second or said additional amplifier.

7. A fuel system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, the maximum output of the pump being controlled, but the system includes circuit means having a first state and a second state, said circuit means when in its second state increasing the maximum output of the pump, said circuit means being driven to its second state when the engine speed is below cranking speed and being driven to its first state when the engine speed is above a datum speed, the datum speed being in excess of the cranking speed.

8. A system as claimed in claim 7, in which the datum speed at which excess pump output is terminated is set by a bistable circuit forming part of said circuit means and the cranking speed at which excess pump output is permitted again is set by a control circuit which until the engine speed falls to cranking speed holds the bistable circuit in a state to prevent excess pump output.

9. A system as claimed in claim 8, in which said control circuit becomes operative when the engine speed is above cranking speed, and when operative is capable of holding the bistable circuit in a state to prevent excess pump output, but not of driving the bistable circuit to a state to prevent excess pump output.

10. A system as claimed in claim 7, in which the circuit means incorporates a bistable circuit switching to the first state at said datum speed, and by virtue of its own differential switching back to the second state at the cranking speed.

11. A system as claimed in claim 7, in which the engine drives a vehicle having a throttle pedal, said throttle pedal providing said demand signal, said circuit means being driven to its second state only when the engine speed is below cranking speed and the throttle pedal is depressed beyond a predetermined position, and the circuit means being driven to its first state when either the engine speed is above the datum speed, or the pedal is not depressed beyond said predetermined position.

12. A system as claimed in claim 7, in which excess pump output is permitted only if the engine temperature is below a predetermined value.

13. A system as claimed in claim 7, including means for maintaining said circuit means in its first state between the datum and cranking speeds even if the supply to the circuit means becomes momentarily disconnected between the datum and cranking speeds.

14. A system as claimed in claim 13, in which said means includes a capacitor.

15. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, the maximum pump output being controlled, but the system includes a control network to which an electrical signal dependent on engine speed is applied, said control network serving to modify the maximum pump output for a range of engine speeds.

16. A system as claimed in claim 15, in which the control network includes a transistor which is turned on at the predetermined engine speed and when conductive modifies an input to a summing amplifier controlling the maximum pump output.

17. A system as claimed in claim 15, in which the control network includes a transistor which receives a signal dependent on engine speed and so conducts at a level determined by engine speed, and circuit means selectively connectible to said transistor so as alternatively to increase or decrease the maximum pump output when the transistor conducts.

18. A system as claimed in claim 15, in which the control network includes a pair of transistors connected as a long tailed pair, one of the transistors receiving an input signal dependent on engine speed and the other transistor modifying the maximum pump output only when the engine speed is in the required range.

19. A system as claimed in claim 18, including a constant current source in the tail of the long tailed pair for setting a minimum level to which the maximum pump output can be reduced.

20. A system as claimed in claim 15, including pre-set resistance means for determining the way in which the maximum pump output varies.

21. A system as claimed in claim 15, in which the maximum pump output is modified below a predetermined engine speed.

22. A system as claimed in claim 15, in which the maximum pump output is modified above a predetermined engine speed.

23. A system as claimed in claim 4, in which each summing amplifier is an operational amplifier with resistive feedback and has an inverting input and a non-inverting input, the signals fed to each summing amplifier being in the form of currents fed to the inverting input terminals thereof.

24. A system as claimed in claim 23, in which the feedback network of each amplifier includes a capacitor for modifying the gain of the amplifier.

25. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, said pump control means comprising and electro-mechanical actuator coupled to the pump to control the pump output, the system including a drive circuit for controlling the electro-mechanical actuator, said signal producing means comprising first, second and third transducers producing respectively output voltages representing engine speed, pump output and demanded engine speed, said summing amplifier comprising a first operational amplifier having its inverting input connected through resistors to the first, second and third transducers, said first amplifier producing an output dependent on the outputs of the first, second and third transducers, said system also including a second operational amplifier connected as a summing amplifier and having its inverting input connected through a resistor to the second transducer, and a discriminator coupling the amplifier producing the greater output to the drive circuit, the arrangement being such that until a predetermined pump output is attained, the discriminator couples the first amplifier to the drive circuit, but when said predetermined rate of supply of fuel is reached, the discriminator couples the second amplifier to the drive circuit to limit the maximum rate of supply of fuel.

26. A system as claimed in claim 25, in which the discriminator comprises a pair of diodes, one coupling each of the amplifiers to the drive circuit, and the resistive feedback paths of the two amplifiers are taken from the input to the drive circuit.

27. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, said pump control means comprising an actuator, and said signal producinig means comprising a first transducer for measuring engine speed, a second transducer for measuring a demand signal set by an operator and a third transducer for measuring the output of the pump, a control circuit including said summing amplifier for controlling the actuator, said control circuit restricting the output of the pump to a predetermined maximum value, a transistor which receives an input from the first transducer and conducts at a predetermined engine speed and circuit means selectively connectible to said transistor so as alternatively to increase or decrease the maximum pump output when the transistor conducts.

28. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, and further including an actuator for controlling the output of the pump, a control circuit including said amplifier for comparing at least two of said signals and providing an output for controlling the actuator and so regulating the output of the pump, said control circuit incorporating means for restricting the maximum pump output, and the system including circuit means having a first state and a second state, said circuit means when in its second state increasing the maximum pump output, said circuit means being driven to its second state when the engine speed is below cranking speed and being driven to its first state when the engine speed is above a datum speed, the datum speed being in excess of the cranking speed.

29. A system as claimed in claim 28 in which the datum speed at which excess pump output is terminated is set by a bistable circuit forming part of said circuit means, and the cranking speed at which excess pump output is permitted again is set by a control circuit which until the engine speed falls to cranking speed hold the bistable circuit in a state to prevent excess pump output.

30. A system as claimed in claim 29, in which said control circuit becomes operative when the engine speed is above cranking speed, and when operative is capable of holding the bistable circuit in a state to prevent excess pump output, but not of driving the bistable circuit to a state to prevent excess pump output.

31. A system as claimed in claim 28, in which the circuit means incorporates a bistable circuit switching to the first state at said datum speed, and by virtue of its own differential switching back to the second state at the cranking speed.

32. A system as claimed in claim 28, in which the engine drives a vehicle and a throttle pedal is provided to provide said demand signal, said circuit means being driven to its second state only when the engine speed is below cranking speed and the throttle pedal is depressed beyond a predetermined position, and the circuit means being driven to its first state when either of the engine speed is above the datum speed, or the pedal is not depressed beyond said predetermined position.

33. A system as claimed in claim 28, in which excess pump output is permitted only if the engine temperature is below a predetermined value.

34. A system as claimed in claim 28, including means for maintaining said circuit means in its first state between the datum and cranking speed, even if the supply to the circuit means becomes momentarily disconnected between the datum and cranking speeds.

35. A system as claimed in claim 34, in which said means includes a capacitor.

36. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, a first summing amplifier to which the three signals are applied, the first summing amplifier comparing the three signals and controlling the pump control means, a second summing amplifier which receives an input representing the pump output and also a reference input, and a discriminator coupling the first and second summing amplifiers to the pump control means, the output from the discriminator at any given instant being the output from the summing amplifier which demands the least fuel, so that the second summing amplifier limits the maximum pump output, said discriminator comprising a pair of diodes through which the outputs of the amplifiers are fed to the pump control means, whereby at any given moment one of the diodes will be conducting and will reverse bias the other diode.

37. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, a first summing amplifier to which the three signals are applied, the first summing amplifier comparing the three signals and controlling the pump control means, a second summing amplifier which receives an input representing the pump output and also a reference input, and a discriminator coupling the first and second summing amplifiers to the pump control means, the output from the discriminator at any given instant being the output from the summing amplifier which demands the least fuel, so that the second summing amplifier limits the maximum pump output, each of said summing amplifiers having a resistive feedback path taken from the input to said pump control means.

38. A fuel supply system for an engine, comprising in combination a pump for supplying fuel to the engine, pump control means for controlling the output of the pump, a first summing amplifier to which are fed said second electrical signal and said demand signal, the first summing amplifier comparing the signals and producing an output for controlling the pump control means, a second summing amplifier to which are fed electrical signals representing a further system parameter and a reference, and a discriminator coupling the first and second summing amplifiers to the pump control means, the output from the discriminator at any given instant being the output from the summing amplifier which demands the least fuel, so that the second summing amplifier limits the maximum value of said further system parameter, the system further including a further amplifier which receives an electrical signal representing a system parameter, and limits the value of said parameter under certain system conditions, and a second discriminator coupling the first and said further amplifier to the pump control means by way of the firstmentioned discriminator, whereby when the first discriminator couples the second discriminator to the pump control means, then the second discriminator couples to the pump control means either the first or said further amplifier.

39. A fuel supply system for an engine comprising in combination a pump for a supplying fuel to the engine, pump control means for controlling the output of the pump, a first summing amplifier to which are fed said second electrical signal and said demand signal, the first summing amplifier comparing the signals and producing an output for controlling the pump control means, a second summing amplifier to which are fed electrical signals representing a further system parameter and a reference, and a discriminator coupling the first and second summing amplifiers to the pump control means, the output from the discriminator at any given instant being the output from the summing amplifier which demands the least fuel, so that the second summing amplifier limits the maximum value of said further system parameter, the system further including an additional amplifier which under certain system conditions modifies said maximum value of said further system parameter, and an additional discriminator coupling the second and additional amplifier to the pump control means by way of the first mentioned discriminator, whereby when the first discriminator couples the additional discriminator to the pump control means, then the additional discriminator couples to the pump control means either the second or said additional amplifier.

40. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, a summing amplifier to which the three signals are applied, the summing amplifier comparing the three signals and controlling the pump control means, a second summing amplifier which receives an input representing the pump output and also a reference input, a discriminator coupling the first-mentioned and the second summing amplifiers to the pump control means, the output from the discriminator at any given instant being the output from the summing amplifier which demands the least fuel, so that the second summing amplifier limits the maximum pump output, the system further including a control network to which an electrical signal dependent on engine speed is applied, said control network including a transistor which is turned on at a predetermined engine speed and when conductive modifies the input to said second summing amplifier so as to modify the maximum pump output.

41. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, the maximum pump output being controlled but is modified in accordance with the pressure of the air.

42. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, said summing amplifier being in operational amplifier with resistive feedback and has an inverting input and a non-inverting input, and all the signals fed to said summing amplifier being in the form of currents fed to the inverting input.

43. A fuel supply system for an engine, comprising in combination a pump for supplying fuel to the engine, pump control means for controlling the output of the pump, means for producing a first electrical signal representing the pump output, means for producing a second electrical signal representing engine speed, means for producing a demand signal representing the required engine speed, and a summing amplifier to which the three signals are applied, the summing amplifier comparing the three signals and controlling the pump control means, said control means comprising an actuator, said summing amplifier forming part of an electronic governor for controlling the actuator, and a feedback circuit associated with the summing amplifier, said feedback circuit including a capacitor and a resistor in series.

44. A fuel supply system for an engine, comprising in combination a pump supplying fuel to the engine, an actuator for controlling the output of the pump, a first transducer for measuring engine speed, a second transducer for measuring a demand signal set by an operator, a third transducer for measuring the output of the pump, a control circuit operable in accordance with the outputs from the transducer for controlling the actuator, said control circuit restricting the output of the pump to a predetermined maximum level, and a control network which receives an input from the first transducer and provides an input to the control circuit for a range of engine speed so that the maximum pump output is modified for said range of speed, said control network including transistors connected as a long tailed pair, and a constant current source in the tail of the long tailed pair for setting a minimum level to which the maximum pump output can be reduced, one of said transistors in the long tailed pair receiving an input signal dependent on engine speed and the other transistor in the long tailed pair modifying the maximum pump output only when the engine speed is in the required range.

45. A system as claimed in claim 43 in which the maximum pump output is modified below a predetermined engine speed.

* * * * *